United States Patent

Nagashima

Patent Number: 5,483,623
Date of Patent: Jan. 9, 1996

[54] PRINTING APPARATUS

[75] Inventor: Nao Nagashima, Yokohama, Japan

[73] Assignee: Canon Kabushiki Kaisha, Tokyo, Japan

[21] Appl. No.: 394,214

[22] Filed: Feb. 24, 1995

Related U.S. Application Data

[63] Continuation of Ser. No. 148,411, Nov. 8, 1993, which is a continuation of Ser. No. 962,708, Oct. 19, 1992, abandoned.

[30] Foreign Application Priority Data

Oct. 24, 1991 [JP] Japan ................................. 3-305502

[51] Int. Cl.$^6$ .................................................. G06K 15/00
[52] U.S. Cl. .................................................. 395/115
[58] Field of Search .................................. 395/101, 114, 395/115, 116, 117, 162–164; 358/404, 444, 467

[56] References Cited

U.S. PATENT DOCUMENTS 4,825,405  4/1989  Makino et al. .
4,991,114  2/1991  Kawamura et al. .
4,992,882  2/1991  Ikenoue et al. .......................... 358/300
5,025,398  6/1991  Nelson .
5,029,327  7/1991  Nureki .
5,047,955  9/1991  Shope et al. ............................ 395/114

FOREIGN PATENT DOCUMENTS 63-039085  2/1988  Japan .
2-220511   1/1990  United Kingdom .

*Primary Examiner*—Arthur G. Evans
*Attorney, Agent, or Firm*—Fitzpatrick, Cella, Harper & Scinto

[57] ABSTRACT

A printing apparatus is disclosed which converts printing information, such as page description language, into dot data, and has an image memory 16 which stores the dot data for the purpose of reusing the dot data for printing an image or overlaying another image.

13 Claims, 3 Drawing Sheets

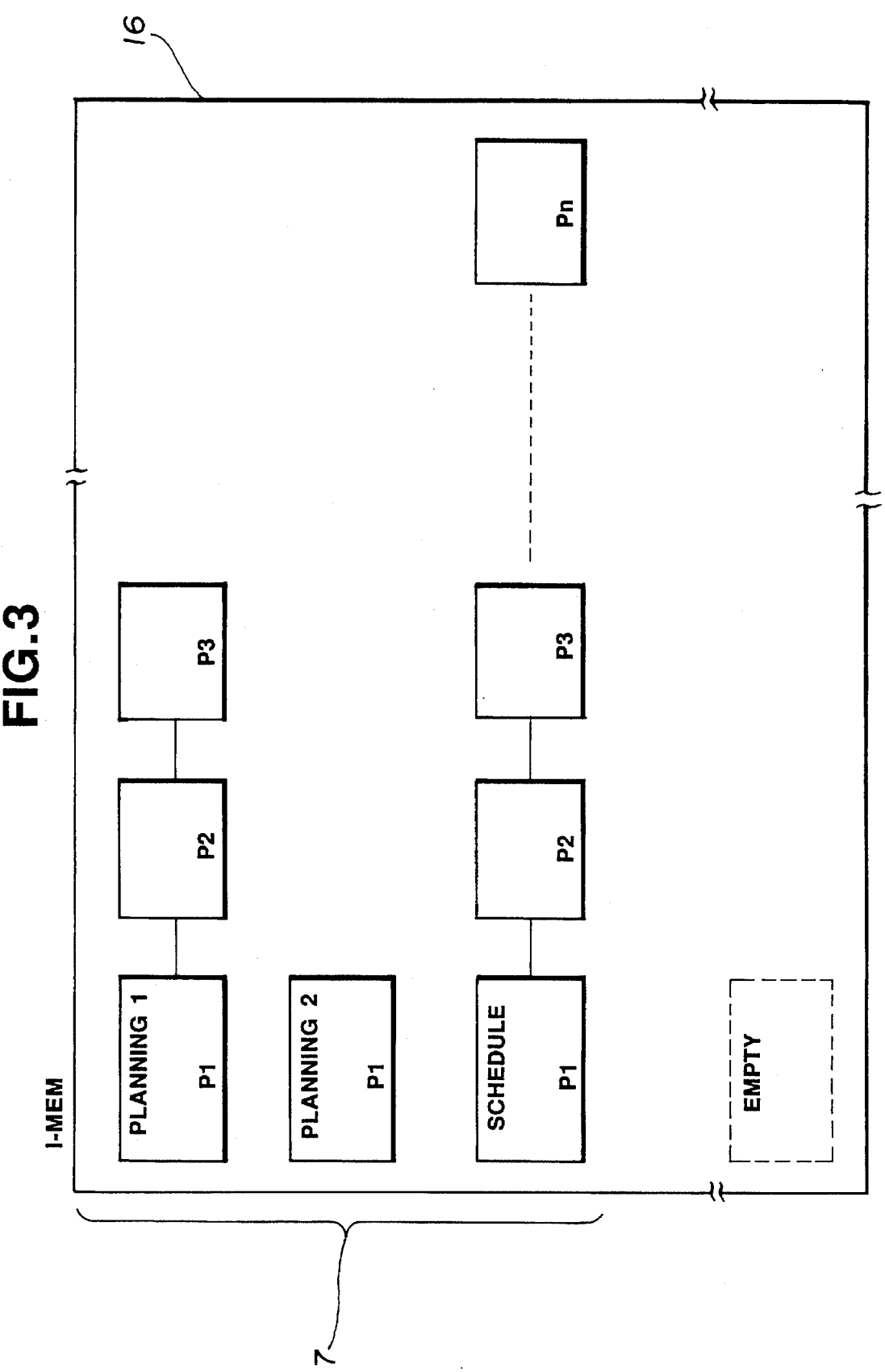

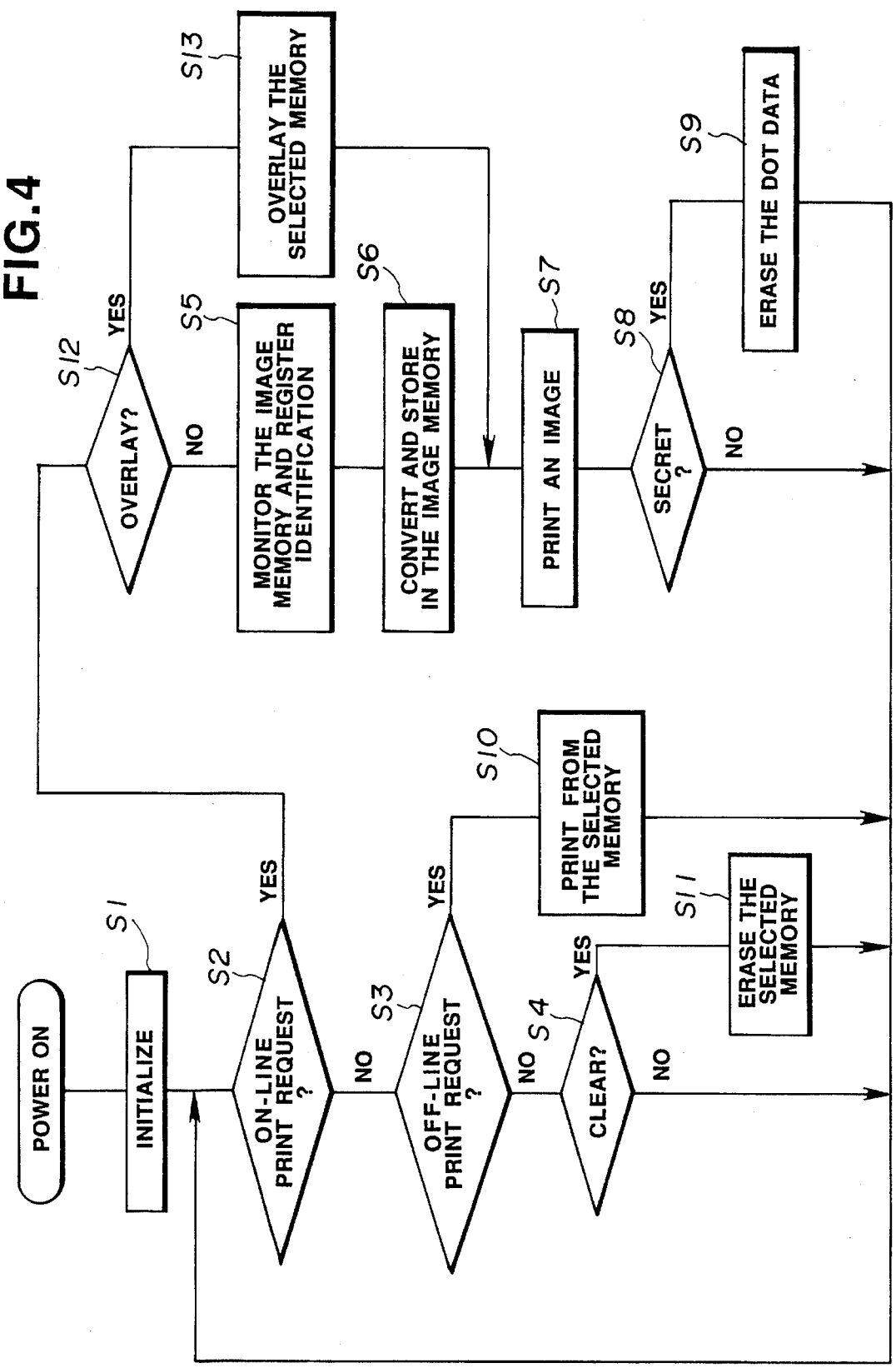

PRINTING APPARATUS

This application is a continuation of application Ser. No. 08/148,411, filed Nov. 8, 1993 which is a continuation of application Ser. No. 07/962,708 filed Oct. 19, 1992, now abandoned.

BACKGROUND OF THE INVENTION

This invention relates to the field of printing, and is primarily, but not exclusively, concerned with a printing apparatus for converting printing information received from a word processor or host computer into dot data and printing an image on the basis of the dot data.

A page printer, arranged to convert character information or figure information from a word processor or a host computer into dot data, is known. The printer prints an image on the basis of the dot data using a printing device, such as a laser beam printer (LBP) or an ink jet printer, etc.

However, in known page printers, it takes time to convert printing information into dot data. Particularly, it takes an appreciable amount of time to convert printing information representing ruled lines or figures into dot data.

This conversion time limits the speed at which a printing operation can be performed.

SUMMARY OF THE INVENTION

The object of the present invention is to overcome the above problems.

One embodiment provides a printing apparatus which can reuse printing information supplied from an external apparatus, easily, effectively and efficiently.

The present invention also provides a printing apparatus which can instruct the reusing of printing information, without being instructed by an external apparatus, such as a host computer or word processor.

The present invention further provides a printing apparatus which can selectively reuse plural pages of printing information previously supplied from an external apparatus.

According to an aspect of the present invention, there is provided a printing apparatus for converting printing information into dot data and printing an image on the basis of the dot data, comprising: memory means for storing plural pages or plural documents of said dot data; and selection means for selecting dot data from among plural pages or plural documents of dot data stored in said memory means.

The aforesaid objectives and advantages and other objectives and advantages of the present invention are evident from the following examples of preferred embodiments.

BRIEF DESCRIPTION OF DRAWINGS

FIG. 3 shows a schematic view of the image memory shown in FIG. 1; and

FIG. 4 shows a flow chart of the printing operation performed by the page printer shown in FIG. 1.

DESCRIPTION OF THE PREFERRED EMBODIMENT

Figure 1:
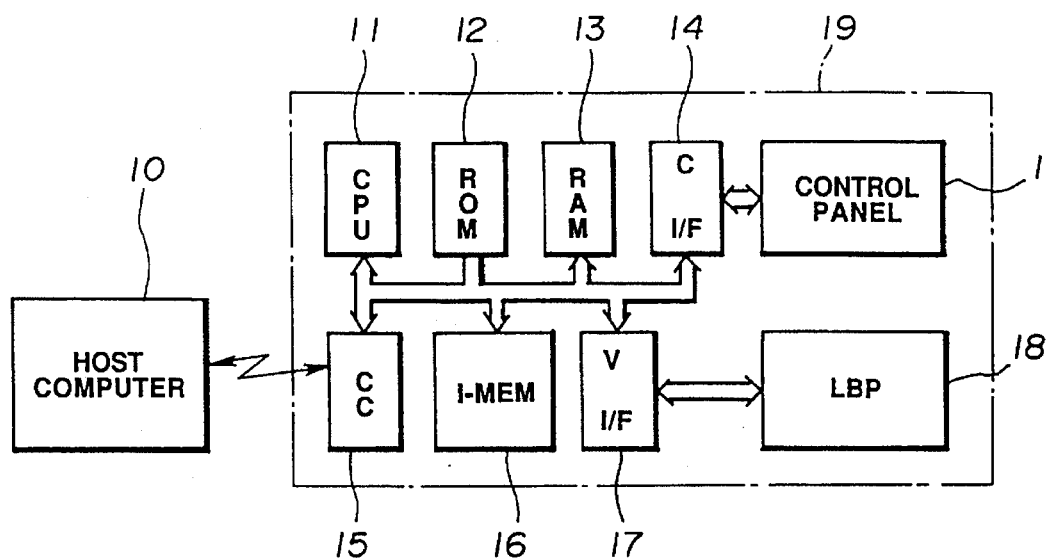
FIG. 1 shows a page printer embodying the present invention.

A block diagram of a page printer 19 embodying the present invention is shown in FIG. 1. The page printer 19 is controlled by a host computer 10, connected together by an all-purpose interface, such as a centronics interface or an RS-232C interface etc. A communications circuit 15 receives printing information from the host computer 10, consisting of characters and figures defined in a page description language (PDL). The all-purpose interface also transmits status information from the page printer 19 back to the host computer 10.

The printer 19 includes a CPU 11, in the form of a micro-computer which controls the whole operation of the page printer and controls the communication circuit 15, a control panel 1 and a laser beam printer (LBP) 18. The CPU 11 also converts the PDL information into dot data and stores the dot data in the image memory 16. Program data, used by the CPU 11, is stored in a ROM 12 and the CPU 11 initiates a control operation enabling it to use a RAM 13, in response to a power-on command.

The image memory 16 stores the dot data to be supplied to the LBP 18 and has sufficient capacity to store a plurality of pages or a plurality of documents of dot data.

The printing information, in the form of PDL characters and figures, is converted into dot data and is stored in the image memory 16 by CPU 11. After that, the dot data is supplied to the LBP 18 from the image memory 16, page by page, via a video interface circuit 17. The video interface circuit 17 transmits instruction signals to the LBP 18, in addition to the dot data, and receives status Signals from the LBP 18.

The LBP 18 performs sequential operations, such as paper feed and image form etc, in accordance with instructions from the CPU 11. In addition, the LBP 18 prints an image on a recording medium on the basis of the dot data read out from the image memory 16.

The control panel 1 has a display portion and input keys. Display data and key data are transmitted between the control panel 1 and the CPU 11 via a control interface 14.

Figure 2:
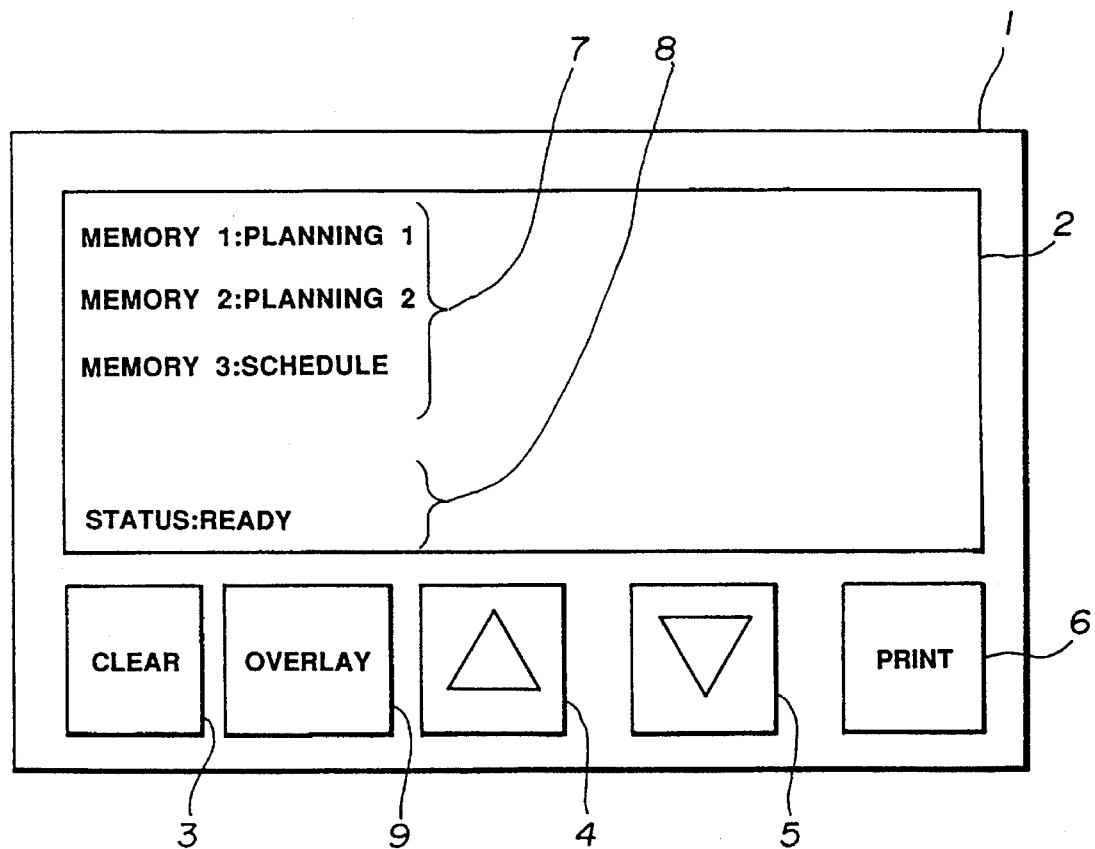
FIG. 2 details a display and keys of a control panel of the page printer shown in FIG. 1.

A plan view showing an arrangement of the control panel 1 is shown in FIG. 2. A display portion 2, fabricated from a liquid crystal dot matrix device for example, is arranged to display characters and figures. In addition, a clear key 3, an up key 4, a down key 5, a print key 6 and an overlay key 9 are provided on the control panel 1.

Unless the document is classified as secret (see later), the image memory 16 continues to store the dot data even after the LBP 18 has printed an image derived from said data. The display portion 2 displays the fact that one or more pages of dot data are stored in the memory 16 at the display part 7, as shown in FIG. 2.

In FIG. 2, "memory 1", "memory 2" and "memory 3" are displayed as identification of that part of memory 16 within which respective different documents or pages are stored. In the case where filing titles are supplied with the printing information from the host computer 10, the filing title, such as "planning 1", "planning 2" and "schedule" may be displayed adjacent to the identification of that part of the memory in which the data is stored.

The dot data, already used for printing images is retained in the image memory 16, while it is possible for said memory 16 to store another page of dot data. Thus, it is possible to store a number of multipage documents (each page typically occupying 1 Mbyte memory). The form of the image memory 16 in FIG. 1 and the storage of multipage documents within it is shown schematically in FIG. 3.

The dot data filing titles displayed on the display panel 2 may be manually created or changed by using the control panel 1 and known techniques. The data representing this identification are stored in a management table of RAM 13 together with memory addresses. Thus, it will be apparent from the above discussion that the dot data representing the various documents to be printed are stored in respective different portions of memory 16. As shown in FIG. 3, such portions are designated as "memory 1", "memory 2", "memory 3" etc. Thus, FIG. 3 shows an example in which documents of various lengths are stored. The first document is entitled "Planning 1" and comprises three pages. The second is entitled "Planning 2" and comprises a single page. The third is entitled "Schedule" and is indicated as comprising n pages.

As shown in FIG. 2, the titles of the stored documents are displayed on display panel 2 together with an indication of the respective memory area in which the documents are stored. A line is displayed under the display "memory 1", indicating that the dot data of memory 1 has been selected. In this state, when print key 6 is activated, this selected dot data comprising the contents of memory 1 is supplied to LBP 18 to print an image on the basis of it.

Alternatively, when clear key 3 is activated, the selected dot data is erased from the image memory 16. If overlay key 9 is activated, other dot data obtained by converting the printing information subsequently received from the host computer 10, will be overlayed onto the selected dot data in the image memory 16.

Up key 4 and down key 5 are used for selecting particular areas of dot data in the image memory 16. For example, when an operator wishes to print an image on the basis of the dot data of identification "memory 3", he may actuate down key 5 twice to display a line under "memory 3" and then he may activate print key 6.

Alternatively, when an operator wishes to erase dot data, which will not be reused later, from the image memory 16, he may activate up key 4 or down key 5 to display a line under an identification representing the dot data to be erased, then he may activate clear key 3. Unwanted dot data may be erased, so that the image memory 16 is not occupied with unnecessary dot data, thus facilitating efficient use.

A display part 8 of the display portion 2 displays the status of the page printer 19, such as on-line print, off-line print, jam and malfunction etc.

FIG. 4 is a flow chart showing the operation of CPU 11. On supplying power, the CPU 11 initializes its input/output ports and each interface circuit (S1). Thereafter, the CPU 11 determines whether or not an on-line print request has been issued by the host computer 10 (S2).

If the on-line print request has not been issued, the CPU 11 determines whether or not an off-line print request to print an image on the basis of the dot data, which was used for the on-line print previously performed and stored in the image memory 16, has been issued from the control panel 1 (S3).

If the off-line print request has not been issued, the CPU determines whether or not clear key 3 of the control panel 1 has been activated (S4).

Alternatively, if the on-line print request has been issued from the host computer 10, the CPU 11 determines whether or not overlay key 9 of the control panel 1 has been actuated (S2, S12).

If the overlay key 9 has not been actuated, the CPU 11 monitors the image memory 16 and examines whether there is dot data which was used for a previous on-line print. When image memory 16 has memory space to store further dot data, the CPU 11 registers a new identification. However, when the image memory 16 does not have memory area to store further dot data, the CPU 11 erases old dot data from the image memory 16 and registers a new identification (S5).

In the situation where the image memory 16 does not have sufficient space to store further dot data, the message indicating that dot data should be erased from the image memory 16, using clear key 3, may be displayed at the display position 2.

Thereafter, the CPU 11 converts the printing information, such as PDL, from the host computer 10 into dot data and stores the dot data in the image memory 16 (S6).

After storing the dot data in the image memory 16, the CPU 11 initiates LBP 18, so as to print an image on the basis of the dot data stored in the image memory 16 (S7).

Thereafter, the CPU 11 determines whether or not the dot data drawn in the image memory 16 should be retained. Specifically, the CPU 11 determines whether or not the dot data represents information designated by the user of the host computer as "secret" (S8). Such secret information is not stored by the printing apparatus and, the CPU 11 erases the dot data from the image memory 16 after completion of the printing operation (S9).

Data indicating that the dot data represents secret information is sent from the host computer 10 together with the printing information, thereby, the dot data representing secret information cannot be printed later. Thus, secret information can only be printed on-line.

Alternatively, if the overlay key 9 has been actuated to indicate the overlay operation, the CPU 11 converts the printing information from the host computer 10 and overlays the dot data on the selected dot data in the image memory 16 (S13). Thereby, an image represented by new dot data can be overlayed on an image represented by previously stored dot data in the image memory 16. Thereafter the CPU 11 initiates the LBP 18 to print the overlayed image, on the basis of the overlayed dot data in the image memory 16 (S7).

When print key 6 of the control panel 1 has been actuated to indicate the off-line print, the CPU 11 reads out the selected dot data from the image memory 16 and supplies the dot data to LBP 18, to print an image (S3, S10).

When clear key 3 of the control panel 1 has been activated, the CPU 11 erases the selected dot data from the image memory 16 (S4, S11). Thereby, unnecessary dot data need not be kept in the image memory 16 for long periods of time.

Other embodiments, employing variations and modifications to the invention described are possible. For example, in the embodiment described, the dot data to be erased or printed is selected using up key 4 and down key 5, but alternatively a plurality of print keys, clear keys or overlay keys may be provided for each page of dot data, to selectively erase, output or overlay dot data in the image memory 16, using these keys. Also, a plurality of display elements, such as LEDs, may be provided to indicate whether or not dot data is stored, corresponding to each memory. Thereby, it is not necessary to provide a large display device, as shown in FIG. 2 and the cost of the control panel may be reduced. Moreover, a large number of copies may be printed in response to the number of times print key 6 is activated. If this construction is adopted, it is desirable to provide a stop key to stop the printing operation before completion of the printing operation. Numeric data input devices, such as ten numeral keys, may be used for indicating the number of copies required.

As detailed above, a plurality of pages of dot data obtained by converting printing information, such as PDL, is kept in the image memory, even after the completion of the printing operation and desired dot data is arbitrarily selected in the image memory. Accordingly, the process in which one copy is printed so as to check the printing result and then the required number of copies are printed or the process in which additional copies are printed after completing a print run, can be efficiently done, because the dot data which was obtained by converting printing information, such as PDL, is still available and can be used repeatedly.

The image memory can store a plurality of pages or a plurality of documents of dot data, which have previously been printed, so desired dot data stored in the image memory can be reused later for reprinting an image, for example. Moreover, the dot data stored in the image memory may be reused by operating the control panel of the page printer, without instructions from the host computer, so that the dot data can easily be reused, while the host computer is available for other tasks.

In this embodiment, the page printer has a laser beam printer (LBP), but an ink jet printer or a thermal printer may be used as an alternative.

The present invention has been explained above with reference to a preferred embodiment but the present invention is not limited to this embodiment and various modifications and changes are possible.

What is claimed is:

1. A printing apparatus for cooperating with input means for inputting to said apparatus printing information and an associated print request, said apparatus comprising:

data conversion means for converting the input printing information to dot data;

printing means for printing an image based on the dot data, wherein said printing means performs a normal printing operation in response to the print request from the input means;

data storage means for storing at least one of a plurality of pages of the dot data, wherein the dot data is retained in said data storage means after the normal printing operation is finished;

determining means for determining whether or not a print request is present; and command receiving means for receiving a manually inputted command if said determining means determines that a print request is not present, wherein the command causes the dot data in said data storage means to be output to said printing means to print the image again.

2. A printing apparatus according to claim 1, further comprising:

selection means for selecting arbitrary dot data among the plurality of pages of dot data stored in said data storage means.

3. A printing apparatus according to claim 2, wherein said printing means includes means for reprinting the image based on the selected dot data stored in the data storage means in response to at least one further print request.

4. A printing apparatus according to claim 2, wherein dot data selected by said selection means is erased from said storage means.

5. A printing apparatus according to claim 2, further comprising means for overlaying further dot data on the dot data selected by said selection means.

6. A printing apparatus according to claim 2, further comprising display means for displaying an indication of dot data stored in said storage means.

7. A printing apparatus according to claim 2, wherein the printing information is defined in a page description language.

8. An image processing apparatus comprising:

receiving means for receiving print information and an associated print request from an external apparatus;

conversion means for converting the print information received by said receiving means into dot data;

output means for outputting the dot data to a printer engine that prints the dot data, wherein the dot data are output to the printer engine to perform a normal printing operation in response to the print request;

memory means for storing at least one of a plurality of pages of the dot data, said memory means retaining the stored dot data after the dot data are outputted to the printer engine in response to the print request; and manual input means for manually inputting a command to again provide the dot data in said memory means to the printer engine, wherein said manual input means can provide a series of commands corresponding to a multiple number of copies of the dot data to be printed by the printer engine.

9. An image processing apparatus according to claim 8, wherein the command erase the retained dot data.

10. An image processing apparatus according to claim 8, wherein the command overlays further dot data generated by said conversion means on the retained dot data.

11. An image processing apparatus according to claim 8, wherein the print information is defined in a page description language.

12. A printing apparatus according to claim 1, wherein said printing means comprises one of a laser beam printer, an ink jet printer and a thermal printer.

13. An image processing apparatus according to claim 8, further comprising a stop key for terminating output of the dot data to the printer engine before all of the multiple number of copies are printed.

* * * * *

UNITED STATES PATENT AND TRADEMARK OFFICE
CERTIFICATE OF CORRECTION

PATENT NO. : 5,483,623
DATED : January 9, 1996
INVENTOR(S) : NAO NAGASHIMA

It is certified that error appears in the above-indentified patent and that said Letters Patent is hereby corrected as shown below:

COLUMN 1

Line 57, "flow chart" should read --flowchart--; and
Line 63, "invent:ion" should read --invention--.

COLUMN 2

Line 23, "Signals" should read --signals--.

COLUMN 6

Line 37, "erase" should read --erases--.

Signed and Sealed this

Fourteenth Day of May, 1996

Attest:

BRUCE LEHMAN

*Attesting Officer*    *Commissioner of Patents and Trademarks*